(12) United States Patent
Wilding (10) Patent No.: US 11,281,770 B2
(45) Date of Patent: Mar. 22, 2022

(54) DETECTION OF STRUCTURED QUERY LANGUAGE (SQL) INJECTION EVENTS USING SIMPLE STATISTICAL ANALYSIS

(71) Applicant: salesforce.com, inc., San Francisco, CA (US)

(72) Inventor: Mark Wilding, Issaquah, WA (US)

(73) Assignee: salesforce.com, Inc., San Francisco (CA)

( * ) Notice: Subject to any disclaimer, the term of this patent is extended or adjusted under 35 U.S.C. 154(b) by 323 days.

(21) Appl. No.: 15/234,753

(22) Filed: Aug. 11, 2016

(65) Prior Publication Data
US 2018/0046665 A1    Feb. 15, 2018

(51) Int. Cl.
  *G06F 21/55* (2013.01)
  *G06F 21/62* (2013.01)
  *G06F 21/00* (2013.01)

(52) U.S. Cl.
  CPC ............ *G06F 21/554* (2013.01); *G06F 21/00* (2013.01); *G06F 21/55* (2013.01); *G06F 21/6227* (2013.01)

(58) Field of Classification Search
  CPC .... G06F 21/554; G06F 21/00; G06F 21/6227; G06F 21/55
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,115,793 A | 9/2000 | Gruber et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

OTHER PUBLICATIONS

Non-Final Office Action for U.S. Appl. No. 15/234,783 dated Sep. 5, 2018, 14 pages.

(Continued)

*Primary Examiner* — Alford W Kindred
*Assistant Examiner* — Tiffany Thuy Bui
(74) *Attorney, Agent, or Firm* — Kwan & Olynick LLP (57) ABSTRACT

Monitoring statements in a database environment. Substantially all database query statements to be executed against a database in the database environment are analyzed to determine if a statement has an outlier statistic. Database queries that do not have an associated outlier statistic are serviced. Further analysis is performed for statements having an outlier statistic to determine if the corresponding statement poses a security risk to the database environment.

30 Claims, 5 Drawing Sheets

(56) References Cited

U.S. PATENT DOCUMENTS

| | | | |
|---|---|---|---|
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,558,796 B1* | 7/2009 | Bromwich | G06F 17/30386 |
| 7,620,655 B2 | 11/2009 | Larsson et al. | |
| 8,225,402 B1* | 7/2012 | Averbuch | G06F 21/554 |
| | | | 717/141 |
| 8,495,742 B2* | 7/2013 | Abadi | H04L 63/1416 |
| | | | 726/24 |
| 8,844,028 B1* | 9/2014 | Cheng | H04L 29/06 |
| | | | 726/22 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0059997 A1* | 3/2004 | Allen | G06F 17/30899 |
| | | | 715/207 |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0138015 A1 | 6/2005 | Dageville et al. | |
| 2006/0031189 A1* | 2/2006 | Muras | G06F 17/30433 |
| 2006/0136396 A1* | 6/2006 | Brobst | G06F 17/30463 |
| 2006/0294058 A1 | 12/2006 | Zabback et al. | |
| 2007/0169055 A1 | 7/2007 | Greifeneder | |
| 2008/0319959 A1 | 12/2008 | Bireley et al. | |
| 2009/0106219 A1* | 4/2009 | Belknap | G06F 17/30469 |
| 2009/0177744 A1 | 7/2009 | Marlow et al. | |
| 2009/0182724 A1 | 7/2009 | Day et al. | |
| 2009/0248618 A1 | 10/2009 | Carlson et al. | |
| 2010/0082517 A1* | 4/2010 | Schapker, II | G06F 17/30306 |
| | | | 706/47 |
| 2010/0095299 A1* | 4/2010 | Gupta | G06F 9/4881 |
| | | | 718/103 |
| 2010/0153431 A1 | 6/2010 | Burger | |
| 2010/0223227 A1* | 9/2010 | Zhao | G06F 16/24522 |
| | | | 707/607 |
| 2010/0251371 A1* | 9/2010 | Brown | G06F 21/554 |
| | | | 726/23 |
| 2010/0312776 A1* | 12/2010 | Burrichter | G06F 17/30395 |
| | | | 707/759 |
| 2010/0325124 A1 | 12/2010 | Wu et al. | |
| 2010/0325620 A1* | 12/2010 | Rohde | G06F 9/44589 |
| | | | 717/154 |
| 2011/0055198 A1 | 3/2011 | Mitchell et al. | |
| 2011/0320435 A1* | 12/2011 | Collins | G06F 17/30442 |
| | | | 707/718 |
| 2012/0240185 A1* | 9/2012 | Kapoor | H04L 63/1425 |
| | | | 726/1 |
| 2014/0310249 A1 | 10/2014 | Kowalski | |
| 2015/0100566 A1 | 4/2015 | Ramaswami et al. | |
| 2015/0163242 A1* | 6/2015 | Laidlaw | G06F 21/552 |
| | | | 726/22 |
| 2015/0170382 A1* | 6/2015 | Bhatia | G06F 16/252 |
| | | | 345/440 |
| 2016/0232206 A1* | 8/2016 | Hayamizu | G06F 17/30477 |
| 2016/0364486 A1* | 12/2016 | Mall | G06F 17/30702 |
| 2017/0147834 A1 | 5/2017 | Bendersky et al. | |

(56) References Cited

U.S. PATENT DOCUMENTS

2017/0171228 A1* 6/2017 McLean ............ H04L 63/1416
2017/0339150 A1* 11/2017 Barsness ............ H04L 63/1425

OTHER PUBLICATIONS

Corrected Notice of Allowability for U.S. Appl. No. 15/234,783 dated Aug. 7, 2019, 2 pages.
Notice of Allowance for U.S. Appl. No. 15/234,783 dated May 1, 2019, 19 pages.
Non-Final Office Action for U.S. Appl. No. 16/656,306 dated Jul. 8, 2020, 12 pages.
Final Office Action for U.S. Appl. No. 16/565,306 dated Jan. 14, 2021, 14 pages.

* cited by examiner

DETECTION OF STRUCTURED QUERY LANGUAGE (SQL) INJECTION EVENTS USING SIMPLE STATISTICAL ANALYSIS

TECHNICAL FIELD

Embodiments relate to techniques for detecting Structured Query Language (SQL) injection. More particularly, embodiments relate to techniques for detecting intrusion attempts via SQL injection by detecting statistically improbable SQL statements.

BACKGROUND

SQL injection is an attack technique in which malicious SQL statements are inserted into an entry field, or other entry point, to attack a security vulnerability. Detection of database intrusion using techniques such as SQL injection can be difficult because the malicious SQL statement is often both correct and valid according to the database engine. For example, an application may list all of a user's contacts in response to "select*from contacts where user=foo'". This valid SQL statement can also be utilized maliciously by a hacker to extract contact information. For example, a potential hacker may be able to retrieve all of the contents of a table by adding an always-true OR clause to the WHERE predicate of a SQL statement via a hacked variable. For example, a variable called userName might be used to construct a SQL statement such as "select*from important_table where user=+userName;". A hacker could in theory change the variable userName to something like "1 OR 1=1". The resulting SQL statement would be "select*from important_table where user=1 OR 1=1"). The WHERE predicate is then rendered useless.

Further, hacked applications can, in theory, also issue arbitrary SQL statements against a database. For example, a hacker could retrieve a list of all existing tables in a database or the contents of any table even though the application was not designed to provide access such as this (and may even be designed to prevent it). In general, errant or malicious SQL statements can be difficult to detect.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Traditional intrusion/attack detection relies on blocking unauthorized access to sensitive tables and/or information and blocking all unnecessary control or abilities ("least privilege"). For example, a database catalog table that can retrieve a list of all other tables should not be accessible to typical applications. A typical application should know which tables it needs access to and not need to look up all tables.

Another traditional strategy is to blacklist functions, tables, views and other database objects that are unnecessary to run the application. For example, some database projects provide a "sleep" function that does nothing other than wait for a period of time. Even seemingly "safe" functions such as these can be used by a potential hacker trying to see whether a SQL statement is being run in the database. If the hack works (e.g., they are able to run the sleep function), it will pause indicating successful access to the database. However, these strategies can be defeated and therefore do not provide sufficient protection.

In one embodiment, per-statement database statistics can be analyzed to identify outlier statements. This outlier detection functionality can be utilized to defend against intrusion attempts such as SQL injection. In one embodiment, the techniques described herein may classify database access attempts as access types and injection types.

In the various embodiments described herein, per-statement database monitoring can be utilized to provide the ability to determine if a particular statement is an outlier statement, which can be designated for further analysis. In one embodiment, this further analysis can be a security analysis to detect intrusion attempts utilizing, for example, SQL injection techniques. As discussed above, malicious SQL injection attempts can utilize otherwise valid SQL statements. In one embodiment, the security analysis can include classification of SQL statements and further analysis of selected SQL statements.

In one embodiment, detection of SQL injection attacks can leverage per-statement SQL monitoring mechanisms utilizing outlier detection. Various embodiments of per-statement monitoring mechanisms are described in U.S. patent application Ser. No. 15/234,783 filed Aug. 11, 2016, entitled "Per-Statement Monitoring in a Database Environment," by Mark Wilding, which is incorporated by reference herein. As a simple example, in a system (e.g., a database node) having a statement rate of 50,000 statements/sec, streaming and/or storing all relevant data may not be viable. Use of outlier detection techniques as described herein can greatly reduce (e.g., by a factor of 100-1,000) the number of statements to be captured. That is, at a statement rate of 50,000 statements/sec, capturing 50-500 statements/sec with associated metadata is much easier to manage than the original 50,000 statements/sec.

In one embodiment, outlier statements can be detected utilizing heuristics that are based on a definition of normal and a definition of distance-from-normal. In one embodiment, the definition of normal can be based, at least in part, on statement context (e.g., tenant identifier in a multitenant environment, page URI) and/or based, at least in part, on statement statistics (e.g., query execution time, total wait time). Two models (non context based and context based) are described below that can be utilized together or separately to identify outlier statements.

In one embodiment, outlier detection can be accomplished without statement context information. Without statement context, the definition of normal is limited to the statistics captured with/during execution of the statement. For example, a long-running complex query that spends 99% of its time sleeping and with no result set could be considered an outlier and therefore suspicious. Another example might be that of a SQL statement that returns 100% of the rows of a large table.

The example above is but one example of an outlier detection ratio that can be utilized. Other examples will be provided herein; however, the examples provided herein are not intended to provide an exhaustive list. In one embodiment, a total aggregate wait time to elapsed execution time ratio can be utilized to identify an outlier statement. In one embodiment, an expected plan cost to actual plan cost ratio can be utilized to identify an outlier statement. However, without context information, outlier detection cannot take into account bind variables (which can affect cardinality), tenant/user information (which can affect cardinality), the specific statement plan (maybe some plans should have more wait time). Thus, in some embodiments statement executions can be tracked with contextual information.

In one embodiment, an execution identifier (executionID) can be utilized to support statement tracking with contextual information. In one embodiment, executionID is a combination of a plan identifier (planID), a bind identifier (bindID), a tenant identifier (tenantID) and/or a user identifier (userID). In alternate embodiments, different and/or additional identifiers can be utilized to provide the executionID. In one embodiment, the executionID corresponds to a unique statement plan for a particular user with a particular set of bind variables. The planID identifies a unique execution plan for a SQL statement. When combined with a tenantID, userID and bindID, the combination defines a fairly unique execution of a statement by a particular user.

In one embodiment, as long as the content of the database is unchanged, statement executions that have the same executionID should have similar elapsed execution times and consumed resources. In one embodiment, the following statistics are tracked with executionID: elapsed time, wait time and/or consumed resources (e.g., processor time). Other and/or different statistics can also be tracked with the executionID. In one embodiment, distance from normal can be some multiple of the average for one or more of the statistics for a unique statement execution. Additional and/or different contextual information can also be utilized. Context information can include, for example, one or more of: sensitive table identifiers, sensitive index identifiers, contact lists, credit card information, which tables/indexes/functions should a tenant/user/page URI have access to, tenant identifiers, user identifier within a tenant, page URI, missing page URI, information on tables "normally" accessed by the requesting app and/or whether a WHERE predicate is typically utilized. For example, if a log in page is trying to access a table that is irrelevant to a login, it could be detected as statistically abnormal and therefore suspect.

In summary, the techniques described herein can function to identify malicious SQL statements in one of two ways: using per-statement statistics to identify SQL statements that are statistically different from normal and/or using application context sent to the database that provides application context such as the application page URI, which can provide another definition of normal (e.g., which SQL statements and database objects are normally accessed by each page URI).

For non-context based detection, statistics are gathered that are attributed to a single SQL statement's execution. These statistics can include, for example, elapsed time, system processor time, user processor time, rows read, I/O time, cache hits, cache misses, etc. Ratios and other mathematical formulations of any statistic can also be useful to determine a definition of normal (e.g., average cache hit ratio per statement).

In one embodiment, per-statement statistics can be used to define "normal" for each unique SQL statement. For example, a database server could track 256 k unique statements based on statementID (e.g., hash of the statement text or parse tree) or planID (e.g., hash of the execution plan). Statements that run and that have a very different statistics pattern (e.g., from average for that statement) can be logged as a statistical outlier for performance, support and/or security. These outlier statements can be further analyzed for malicious intent/activity. Outliers can be based on the unique statement's own averages or based on the average across all statements.

In one embodiment, statements are categorized in one of several categories. In one embodiment, these categories include: 1) Unique statements; 2) First run, not yet tracked statements; 3) Run again, but no longer tracked statements; and 4) Run again, tracked statements. In one embodiment, for outlier tracking/monitoring purposes, the first three categories are treated as equivalent untracked statements.

In one embodiment, the definition of normal for a statement is based on the executionID and a set of one or more statistics including, for example, execution count, elapsed time, processor time, wait time, row returned vs total rows, actual plan cost and/or expected plan cost. With this information, the average for each of the aggregate statistics can be calculated for each tracked statement. A distance from normal can be based on a threshold, for example, a multiple (or distance) from normal such as, for example, five times normal, twice normal, 10 times normal, etc. For example, there should be very few statements that return 100% of the rows for a large table. This rarity can be detected by comparing to statistical norms. Selecting 100% of the rows using several SQL statements could be detected by utilizing statistics per session or via application context such as per page.

In one embodiment, a hash table based on the executionID can be maintained to store a large number (e.g., 10,000, 50,000, 500,000) of statement executionIDs with the corresponding outlier statistics. In one embodiment, a victimization algorithm can be utilized to maintain the most recent, or more recent, statements in a tracking hash table.

In one embodiment, new statements (statements that will be run frequently but have yet to be tracked) and statements that are run infrequently (already victimized) are considered untracked statements. In one embodiment, untracked statements are monitored using the context-less outlier detection techniques described above, which can be based on, for example, normalizing ratios. In one embodiment, the context-based outlier detection mechanism can start when statement executions begin flowing, but outliers are not flagged/identified until a warm up period has elapsed. In one embodiment, the warm up period is based on one or more a ratio of executed statements to tracked statement, a number of statements executed and/or uptime. Other and/or different factors can also be utilized. In one embodiment, once the database is warmed up, the outlier detection mechanism can forward outlier statistics to a historical statements store.

In one embodiment, rate throttling can be performed if the number of outliers identified is too high. In one embodiment, tracked statement outliers can be throttled based on the last time sent per unique statement and all statement outliers can be throttled on a selected aggregate rate, for example, 500 outliers/sec.

Figure 1:
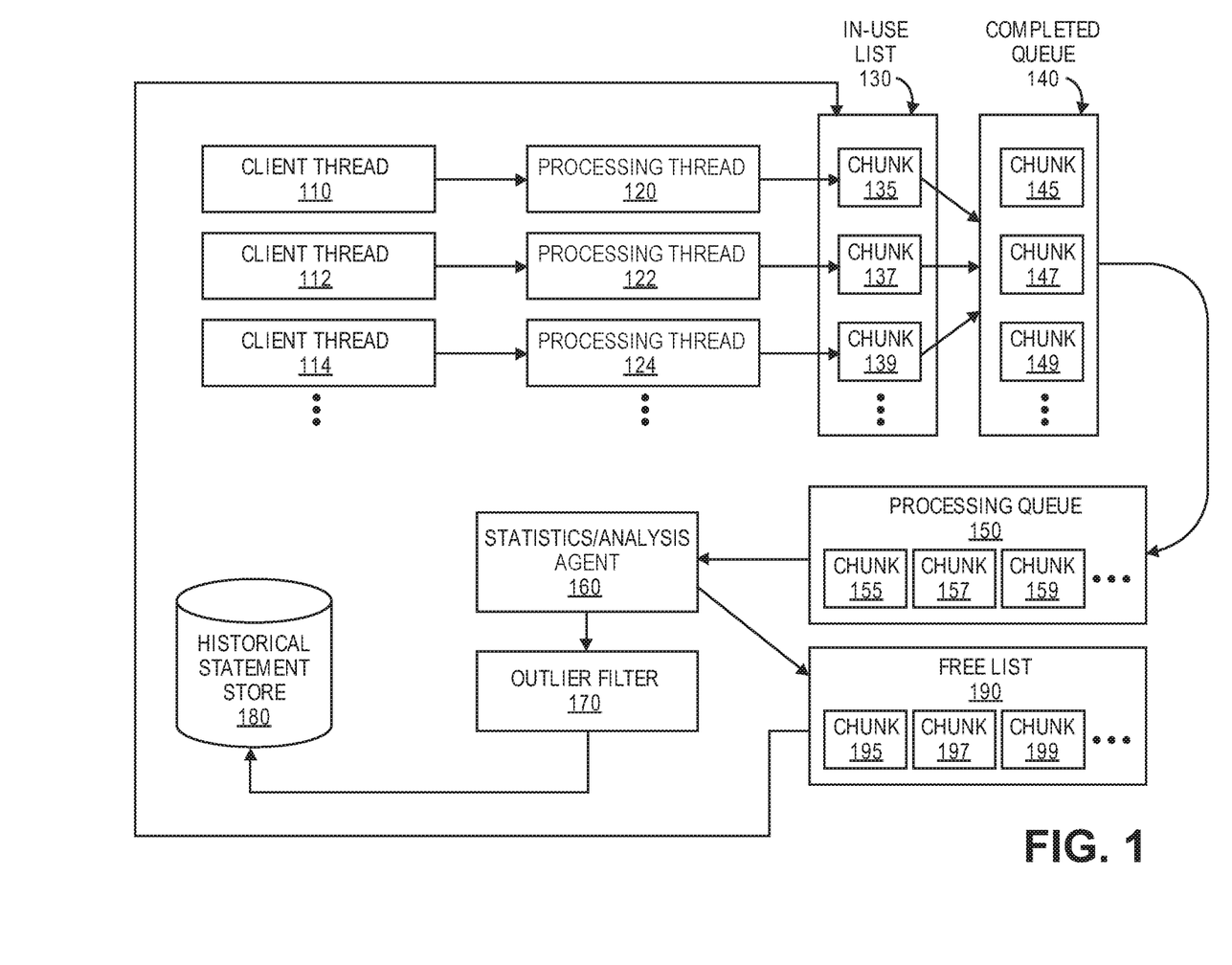
FIG. 1 is a block diagram of one embodiment of a database statement monitoring architecture.

FIG. 1 is a block diagram of one embodiment of a database statement monitoring architecture. In one embodiment, the database statement monitoring architecture utilizes a set of lists (e.g., in-use list 130, free list 190) and queues (e.g., completed queue 140, processing queue 150) to manage chunks of data having statistical information related to one or more database statements. In one embodiment, the database statements are structured query language (SQL) statements; however, other types of database statements can be analyzed in a similar manner.

The example of FIG. 1 illustrates three clients threads (e.g., 110, 112, 114), which can be threads executed by one or more processors within a computing environment. In one embodiment, the computing environment can be an on-demand services environment, for example, a multitenant computing environment having one or more databases. In one embodiment, each client thread has a corresponding processing thread (e.g., client thread 110→processing thread 120, client thread 112→processing thread 122, client thread 114→processing thread 124). Any number of client threads can be supported.

In one embodiment, chunks (e.g., 195, 197, 199) start in free list 190 and are moved to in-use list 130. In one embodiment, chunks are moved from free list 190 to in-use list 130 under latch. In one embodiment, in-use list 130 includes one chunk of memory for each processing thread (e.g., processing thread 120→chunk 135, processing thread 122→chunk 137, processing thread 124→chunk 139) providing statement statistical information. When a chunk in in-use list 130 is full, the full chunk is moved to completed queue 140. Completed queue 140 stores chunks (e.g., 145, 147, 149) that are sufficiently filled with statement statistical information until they can be moved to processing queue 150.

In one embodiment, statistics/analysis agent 160 operates to remove chunks (E.G., 155, 157, 159, . . . ) from processing queue 150 and perform the analysis described herein on and moves chunks from processing queue to free list 190 after the analysis. Chunks from free list 190 can be used by in-use list 130 to replace chunks that have been moved out to completed queue 140.

In one embodiment, outlier filter 170 is coupled with statistics/analysis agent 160 to identify outlier statements by performing the analysis described above to find statements that are a sufficient distance from normal. In one embodiment, the statements identified by outlier filter 170 can be subject to further analysis before, during or after operation.

In one embodiment, statement execution can be used to update per-statement statistics directly in a shared memory hosting the chunks described in FIG. 1. In one embodiment, this can be supported via use of a per-statement pointer. In one embodiment, a stack of statement statistics pointers can be utilized to support nested SQL statements. In one embodiment, processing mechanisms are provided that can measure resource utilization including, for example, processor utilization, memory allocation, disk space utilization, network utilization, etc.

Figure 2:
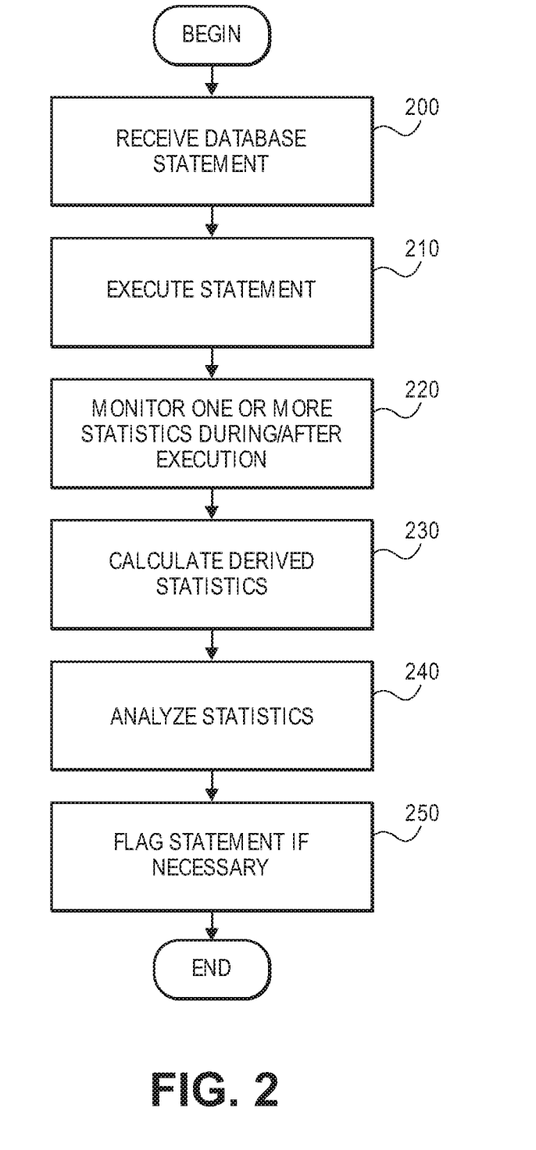
FIG. 2 is a flow diagram of one embodiment of a non-contextual technique for detecting outlier statements.

FIG. 2 is a flow diagram of one embodiment of a non-contextual technique for detecting outlier statements. In one embodiment, the techniques described with respect to FIG. 2 can be performed by one or more processors in a computing environment providing at least database functionality. Embodiments of database environments are described in greater detail below.

In one embodiment, outlier detection is performed without contextual information, which can be referred to as analysis of per-statement statistics. That is the statistics that are analyzed are attributed to a single SQL statement's execution (e.g., elapsed time, system processor time, user processor time, rows read, I/O time, cache hits, cache misses). Ratios and other mathematical formulations of any statistic can also be utilized to determine a definition of normal (e.g., average cache hit ratio per statement).

In one embodiment, per-statement statistics can be used to define normal for each unique SQL statement. For example, a database server could track 256 k unique statements based on statementID (e.g., hash of the statement text or parse tree) or based on planID (e.g., hash of the execution plan). In one embodiment, statement that run and that have a very different statistics pattern from average for the statement can be logged as a statistical outlier for performance, support and/or security. Outliers can be based on the unique statement's own averages or based on the average across all statements.

In one embodiment, the first time a new unique statement is processed, it can be logged or traced using a high-speed trace mechanism, for example, the one discussed above. Once the statement has built up a reasonable amount of statistics (e.g., 10 executions, 50 executions, 250 executions), the analysis mechanism can use the average of those prior runs as a basis to define normal. This can identify, for example, singular sessions that do not behave like other sessions, a query that returns a larger than normal number of rows, etc.

One embodiment, for a technique to provide per-statement statistical analysis is presented in FIG. 2. A database statement is received, 200. In one embodiment, the database statement is a SQL statement; however, any other languages and/or structures can be supported as well. The statement is executed, 210 by the one or more processors in the database environment.

During and/or after execution of the statement, one or more statistics can be monitored, 220. In one embodiment, wait time, execution time, expected execution plan cost, actual execution plan cost, processor utilization, bandwidth utilization, memory utilization and/or other statistics can be measured. For the non-contextual embodiment, only statistics directly related to execution of the statement are utilized.

Derived statistics are calculated by the one or more processors, 230. In one embodiment, a ratio between wait time and execution time is calculated. In one embodiment, a ratio between an expected execution plan cost and an actual execution plan cost is calculated. Other calculated statistics can also be utilized.

The statistics are analyzed, 240. In one embodiment, the chosen statistics are compared to a value that is considered normal and a "distance-from-normal" value is determined. Distance-from-normal can be a multiple of the normal value, a ratio involving the normal value, or some other function of the normal value.

If a statement is considered an outlier based on the statistical analysis, it is flagged, 250. Flagging a statement can result in further actions, for example, blocking the results from being returned, undoing the operations caused by the statement, blocking the source of the statement, notifying a system administrator, etc.

Figure 3:
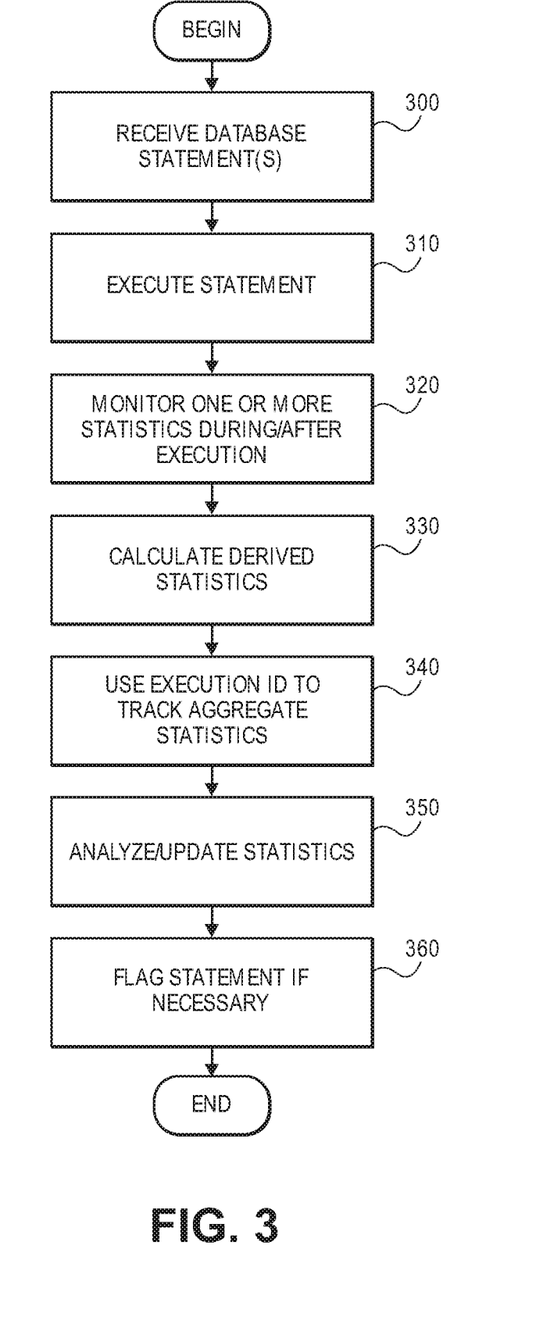
FIG. 3 is a flow diagram of one embodiment of a contextual technique for detecting outlier statements.

FIG. 3 is a flow diagram of one embodiment of a contextual technique for detecting outlier statements. Some examples of app context identifiers include, for example, an application tenant identifier and/or a specific user of the application, a page URI of an application driving the database, the app functional area (e.g., reporting, search, contacts, calendar). In one embodiment, the techniques described with respect to FIG. 3 can be performed by one or more processors in a computing environment providing at least database functionality. Embodiments of database environments are described in greater detail below.

In one embodiment, an execution identifier (executionID) can be utilized to support statement tracking with contextual information. In one embodiment, executionID is a combination of a plan identifier (planID), a bind identifier (bindID), a tenant identifier (tenantID) and/or a user identifier (userID). In alternate embodiments, different and/or additional identifiers can be utilized to provide the executionID. In one embodiment, the executionID corresponds to a unique statement plan for a particular user with a particular set of bind variables. Use of the planID removes the need to identify the query size attributes (e.g., number of plan operators). Use of the tenantID, userID and/or bindID defines a very specific statement execution. Additional and/or different contextual information can also be utilized including, for example, organization/tenant identifier, user identifier, thread identifier, thread name, page URI, hostname, etc.

In one embodiment, context information can be provided by an app, for example, app tenant and/or app tenant user (in a multitenant environment), page URI, app feature, and/or other useful information. Context information can be useful in determining whether a SQL statement is distant from normal. In one embodiment, a single hash (e.g., hash on page URI AND statementID) can be used, or a dual-layer hash table (e.g., hash first to find the current page URI and then again to check for statementID) can be utilized.

For example, a page URI will typically result in a limited number of SQL statements against a limited number of database objects. A contacts page will likely access a table that retrieves a list of contacts for the user. This pattern of page URI access can be used to generate a statistical definition of normal over time and then identify outlier statements. In other words, a database server can "learn" which SQL statements and database objects are typically used by a page URI and log access that is different from this definition of normal. Thus, if a hacker does not use the correct application context, the attempted access can be detected as an attack. Or if a hacker issues a SQL statement that is not statistically related to a page URI, the attempted access can be detected as an attack.

One or more database statements are received, 300. In one embodiment, the database statement(s) are SQL statements; however, any other languages and/or structures can be supported as well. The statement(s) are executed, 310 by the one or more processors in the database environment.

During and/or after execution of the statements, one or more statistics can be monitored, 320. In one embodiment, wait time, execution time, expected execution plan cost, actual execution plan cost, processor utilization, bandwidth utilization, memory utilization and/or other statistics can be measured.

Derived statistics are calculated by the one or more processors, 330. In one embodiment, the following statistics are tracked with executionID: elapsed time, wait time and/or consumed resources (e.g., processor time). Other and/or different statistics can also be tracked with the executionID, 340.

Statistics are analyzed and/or updated, 350. In one embodiment, distance from normal can be some multiple of the average for one or more of the statistics for a unique statement execution. In one embodiment, outlier statements can be detected utilizing heuristics that are based on a definition of normal and a definition of distance-from-normal. The definition of normal can be based, at least in part, on statement context (e.g., tenant identifier in a multitenant environment, page URI) and/or based, at least in part, on statement statistics (e.g., query execution time, total wait time). Distance from normal can also utilize other statistical calculations.

In one embodiment, the definition of normal for a statement is based on the executionID plus a set of one or more statistics including, for example, execution count, elapsed time, processor time, wait time, actual plan cost and/or expected plan cost. With this information, the average for each of the aggregate statistics can be calculated for each tracked statement. A distance from normal can be based on a threshold, for example, a multiple (or distance) from normal such as, for example, five times normal, twice normal, 10 times normal, etc. The definition of normal can be based on all tracked statements or the specific unique SQL statement as identified by execution ID.

If a statement is considered an outlier based on the statistical analysis, it is flagged, 360. Flagging a statement can result in further actions, for example, blocking the results from being returned, undoing the operations caused by the statement, blocking the source of the statement, notifying a system administrator, etc.

Figure 4:
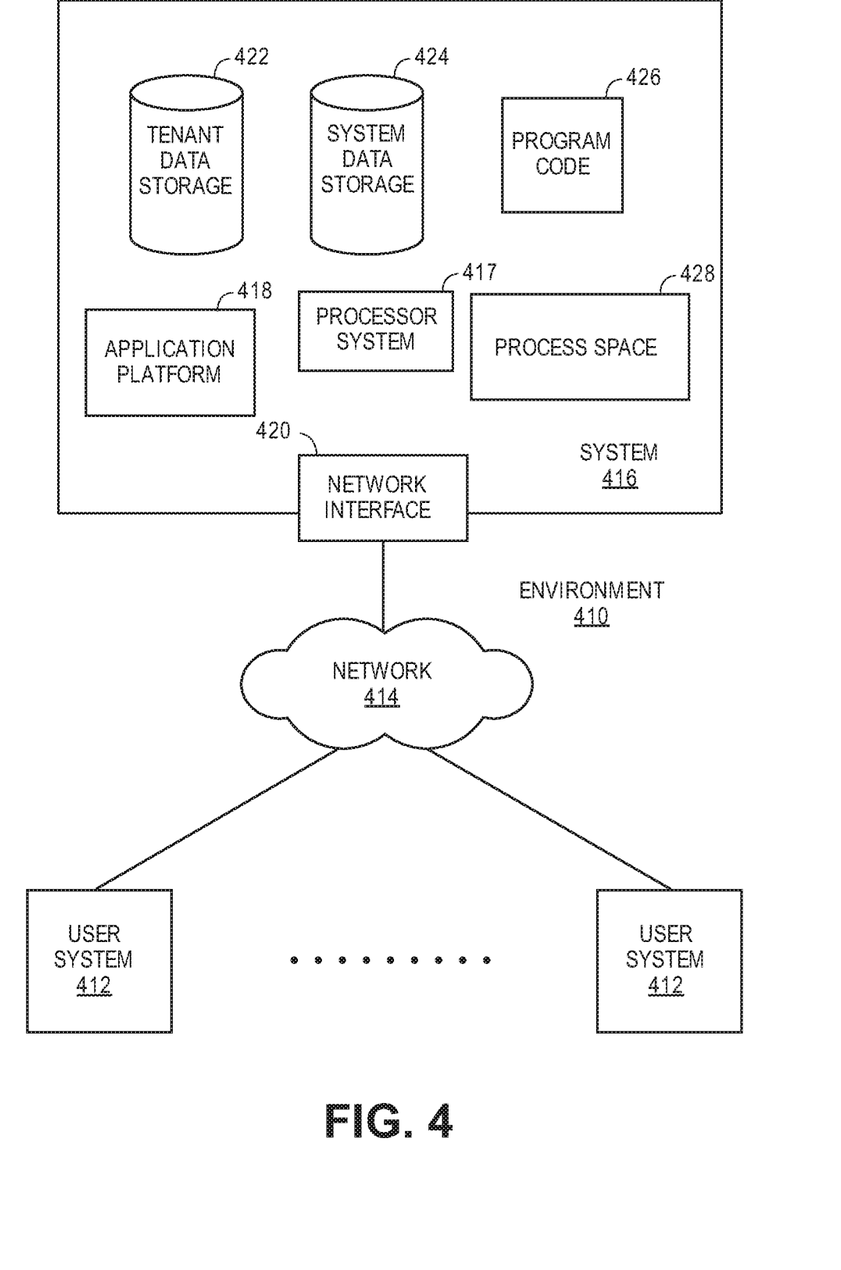
FIG. 4 illustrates a block diagram of an environment in which an on-demand database service might be provided.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in herein FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system

412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
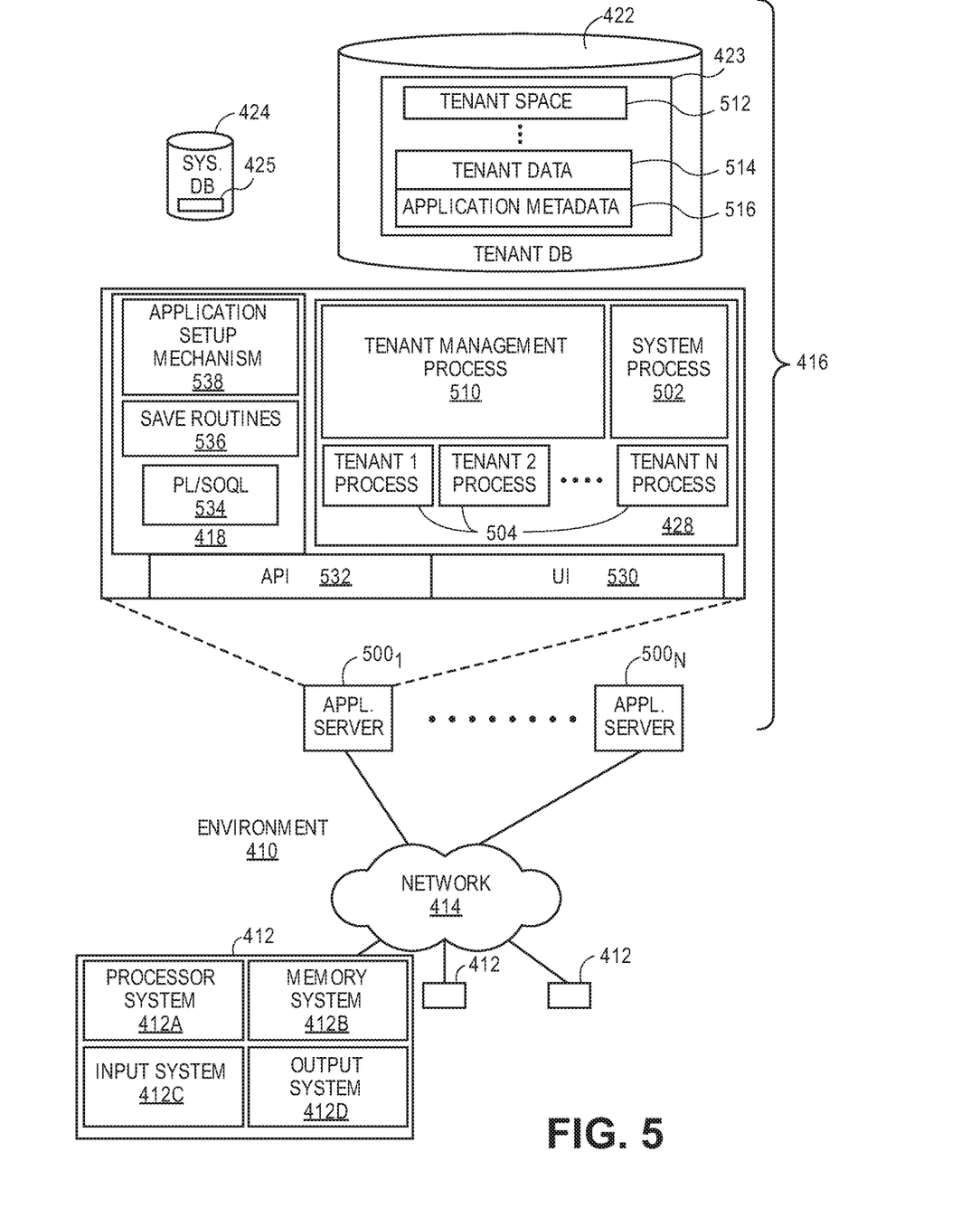
FIG. 5 illustrates a block diagram of an environment in which an on-demand database service might be provided.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers 500₁-400$_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Pat. No. 4,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server 500₁ might be coupled via the network 414 (e.g., the Internet), another application server 500$_{N-1}$ might be coupled via a direct network link, and another application server 500$_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for monitoring statements in a database environment, the method comprising:
analyzing, with one or more processors in the database environment, database query statements to be executed against a database in the database environment;
limiting, with the one or more processors, a number of statements of the database query statements on which a security analysis is performed by pre-filtering the database query statements based on statistical analysis of the database query statements to identify those of the database query statements that are statistically abnormal, including determining through the analyzing whether a statement of the database query statements has an associated outlier statistic indicative of potential malicious use of the statement using at least either per-statement statistics to identify database query statements that are statistically different from normal or using application context sent to and stored in the database to provide a definition of normal to which a corresponding database query statistic is compared, wherein, when using the per-statement statistics, determining whether the statement has the associated outlier statistic comprises performing a non-contextual analysis of the statement and the associated outlier statistic relates to execution of the statement;

servicing, with the one or more processors when the statement does not have the associated outlier statistic, one or more database queries that include the statement that does not have the associated outlier statistic by executing database query statements corresponding to the one or more database queries against data stored in the database; and performing the security analysis, with the one or more processors when the statement has the associated outlier statistic, on the corresponding database query statements to determine whether the corresponding database query statements pose a security risk to the database environment.

2. The method of claim 1 wherein determining whether the statement has an associated outlier statistic indicative of potential malicious use of the statement comprises analyzing information associated with a page universal resource identifier (URI).

3. The method of claim 2 wherein the analyzing information associated with the page URI comprises determining a frequency of query requests for a table of information from the page URI.

4. The method of claim 2 wherein the analyzing information associated with the page URI comprises determining whether the database query statement and associated predicates has been received previously from the page URI.

5. The method of claim 2 wherein the analyzing information associated with the page URI comprises determining whether the database query statement without associated predicates has been received previously from the page URI.

6. The method of claim 1 wherein analyzing the database query statements comprises determining a normal value for use in analyzing the database query statements and further comprises determining a distance from normal for each database query statement.

7. The method of claim 6 wherein said determining whether a statement has an associated outlier statistic indicative of potential malicious use of the statement comprises comparing the distance from normal for the statement to a preconfigured threshold value.

8. The method of claim 1 wherein the outlier statistic indicative of potential malicious use of the statement comprises one or more statistics based on elapsed time, wait time, resource consumption, execution plan complexity, and execution plan size.

9. The method of claim 1 wherein the database query statements comprise structured query language (SQL) compliant statements.

10. The method of claim 9 wherein the SQL compliant statements comprise valid SQL compliant statements.

11. The method of claim 1 wherein the non-contextual analysis of the statement comprises determining a ratio of wait time and execution time for the statement.

12. The method of claim 1 wherein the non-contextual analysis of the statement comprises determining a ratio of expected execution plan cost and actual execution plan cost.

13. The method of claim 1 wherein determining if the statement has an associated outlier statistic indicative of potential malicious use of the statement comprises performing a contextual analysis of the statement.

14. The method of claim 13 wherein the contextual analysis of the statement comprises utilization of one or more of: an application name, a tenant identifier, a user identifier.

15. The method of claim 13 wherein the contextual analysis of the statement comprises utilization of an execution identifier that identifies a unique statement plan for a particular user with a particular set of bind variables.

16. A non-transitory computer-readable medium having stored thereon instructions that, when executed by one or more processors, cause the one or more processors to:

analyze, with one or more processors in the database environment, database query statements to be executed against a database in the database environment;

limit a number of statements of the database query statements on which a security analysis is performed by pre-filtering the database query statements based on statistical analysis of the database query statements to identify those of the database query statements that are statistically abnormal including determining through the analyzing whether a statement of the database query statements has an associated outlier statistic indicative of potential malicious use of the statement using at least either per-statement statistics to identify database query statements that are statistically different from normal or using application context sent to and stored in the database to provide a definition of normal to which a corresponding database query statistic is compared, wherein, when using the per-statement statistics, determining whether the statement has the associated outlier statistic comprises performing a non-contextual analysis of the statement and the associated outlier statistic relates to execution of the statement;

service, with the one or more processors when the statement does not have the associated outlier statistic, one or more database queries that include the statement that does not have the associated outlier statistic by executing database query statements corresponding to the one or more database queries against data stored in the database; and perform the security analysis, with the one or more processors when the statement has the associated outlier statistic, on the corresponding database query statements to determine whether the corresponding database query statements pose a security risk to the database environment.

17. The non-transitory computer-readable medium of claim 16 wherein determining whether the statement has an associated outlier statistic indicative of potential malicious use of the statement comprises analyzing information associated with a page universal resource identifier (URI).

18. The non-transitory computer-readable medium of claim 17 wherein the analyzing information associated with the page URI comprises determining a frequency of download requests for a table of information from the page URI.

19. The non-transitory computer-readable medium of claim 17 wherein the analyzing information associated with the page URI comprises determining whether the database query statement and associated predicates has been received previously from the page URI.

20. The non-transitory computer-readable medium of claim 17 wherein the analyzing information associated with the page URI comprises determining whether the database query statement without associated predicates has been received previously from the page URI.

21. The non-transitory computer-readable medium of claim 16 wherein analyzing the database query statements comprises determining a normal value for use in analyzing the database query statements and further comprises determining a distance from normal for each database query statement.

22. The non-transitory computer-readable medium of claim 21 wherein said determining whether a statement has an associated outlier statistic indicative of potential malicious use of the statement comprises comparing the distance from normal for the statement to a preconfigured threshold value.

23. The non-transitory computer-readable medium of claim 16 wherein the outlier statistic indicative of potential malicious use of the statement comprises one or more statistics based on elapsed time, wait time, resource consumption, execution plan complexity, and execution plan size.

24. The non-transitory computer-readable medium of claim 16 wherein the database query statements comprise structured query language (SQL) compliant statements.

25. The non-transitory computer-readable medium of claim 24 wherein the SQL compliant statements comprise valid SQL compliant statements.

26. The non-transitory computer-readable medium of claim 16 wherein the non-contextual analysis of the statement comprises determining a ratio of wait time and execution time for the statement.

27. The non-transitory computer-readable medium of claim 26 wherein the non-contextual analysis of the statement comprises determining a ratio of expected execution plan cost and actual execution plan cost.

28. The non-transitory computer-readable medium of claim 16 wherein determining if the statement has an associated outlier statistic indicative of potential malicious use of the statement comprises performing a contextual analysis of the statement.

29. The non-transitory computer-readable medium of claim 28 wherein the contextual analysis of the statement comprises utilization of one or more of: an application name, a tenant identifier, a user identifier.

30. The non-transitory computer-readable medium of claim 28 wherein the contextual analysis of the statement comprises utilization of an execution identifier that identifies a unique statement plan for a particular user with a particular set of bind variables.

* * * * *